June 3, 1947     C. R. WALLER     2,421,445
REVERSIBLE GAS TURBINE

Filed May 5, 1944     2 Sheets-Sheet 1

WITNESS:

INVENTOR
Carl R. Waller
BY
ATTORNEYS.

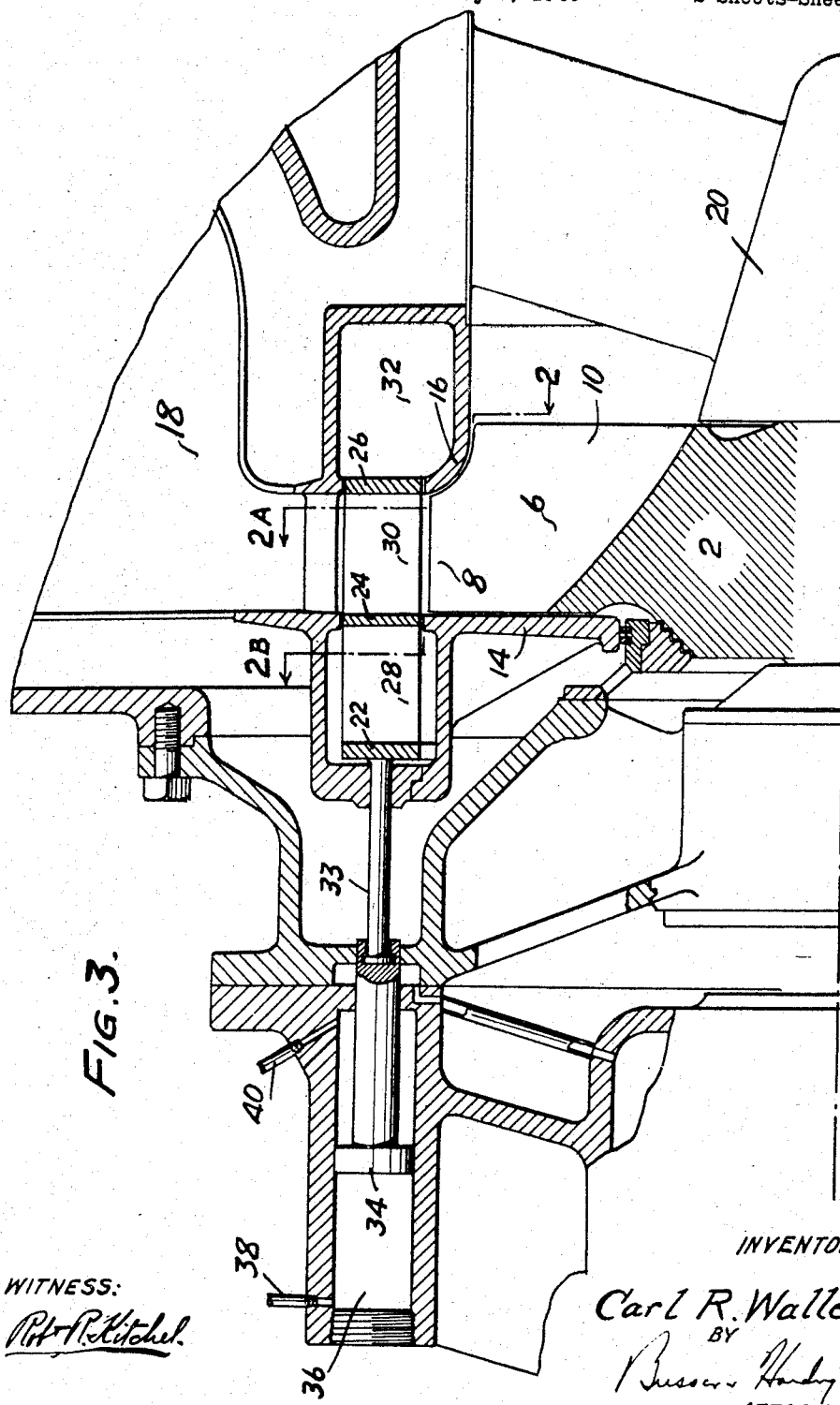

Patented June 3, 1947

2,421,445

UNITED STATES PATENT OFFICE 2,421,445

REVERSIBLE GAS TURBINE

Carl R. Waller, Trenton, N. J., assignor to De Laval Steam Turbine Company, Trenton, N. J., a corporation of New Jersey Application May 5, 1944, Serial No. 534,219

2 Claims. (Cl. 253—51)

This invention relates to reversible gas turbines and has particular reference to reversal effected in such fashion as to avoid sudden fluctuations in flow and temperature of the gas.

For marine applications it is essential that a gas turbine used for driving purposes should be reversible if there are to be avoided complicated mechanisms for securing reversal of a propeller shaft with the turbine continuously rotating in one direction.

While a turbine for such applications should operate at high efficiency during forward propulsion, the matter of efficiency and of maximum delivery of power is generally a minor consideration during astern operation provided sufficient power may be generated to secure a relatively slow speed. Through the use of turbine wheels of the type described in the patents to Birmann Nos. 1,926,225; 1,959,703; 2,283,176, effective reversal may be accomplished merely by reversing the flow of driving gases from nozzles with respect to their direction about the axis of rotation of the turbine rotors. A second consideration arises, however, in that any satisfactory scheme must avoid sudden fluctuations in flow and temperature of the driving gases such as would ordinarily take place due to opening and closing of admission valves to the turbine as would ordinarily be effected during maneuvering.

The broad object of the present invention is the provision of a reversible turbine in which not only will ample power be produced during reversal for astern operation of the vessel but this will also be effected in the change from forward operation without disturbance of the flow which means that the temperature can be held fairly constant throughout the change.

Figure 2:
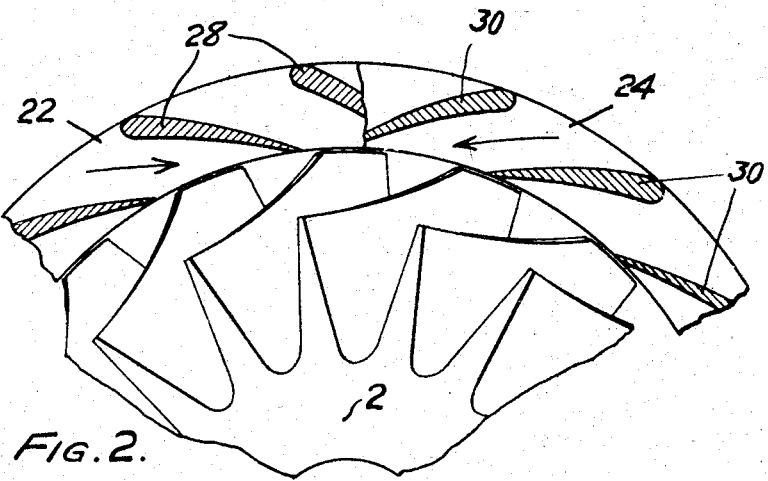
Figure 1:
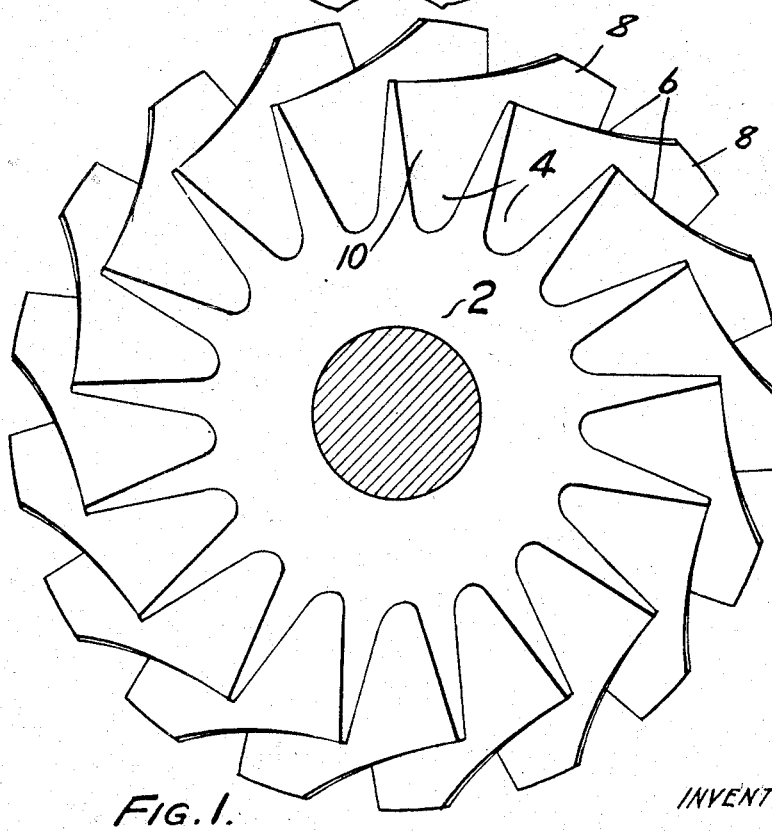

This, and other objects of the invention, particularly relating to details, will become apparent from the following description read in conjunction with the accompanying drawings, in which Figure 1 is an elevation, with the shaft sectioned, of the type of turbine wheel to which the invention is most effectively applied;

Figure 2 is a fragmentary sectional view, the right-hand portion of which is taken on the surface the trace of which is indicated at 2—2A in Figure 3 and the left-hand portion of which is taken on the surface the trace of which is indicated at 2—2B of Figure 3; and Figure 3 is an axial section taken through the turbine wheel and its associated parts, the turbine wheel itself being illustrated in circumferential projection.

The turbine wheel 2 shown in the drawings is of the type fully described in the Birmann patents referred to above. It comprises passages 4 defined by vanes 6, which passages extend in skew direction about the axis of rotation from their inlet portions 8 to their outlet portions 10, the path of flow relative to the wheel being both axial and radially inwardly, the direction of forward rotation being clockwise as viewed in Figures 1 and 2. The inlet periphery of the wheel is desirably at its maximum diameter, the inlet edges of the vanes lying in, or substantially in, a cylindrical surface. This location of the inlet edges is not essential, however, and the inlet edges may be arranged as illustrated in said Birmann patents.

As illustrated in Figure 3, the wheel is surrounded by a casing comprising an annular portion 14, backing the wheel and forming in part a boundary for the gas passages, and a portion 16 forming an outer boundary for the gas passages closely adjacent the periphery of the wheel. Gas is supplied to the wheel from a chest 18, preferably taking an annular form, and is discharged over a conical fixed guiding surface 20. The discharge for a wheel operating at high efficiencies has relatively little rotation.

For the purpose of providing jets directed in opposite directions as indicated above a nozzle assembly is provided comprising rings 22, 24, and 26 between pairs of which are arranged vanes 28 and 30, respectively, defining the forward and reverse nozzles. The gas passing through the nozzles defined by these vanes acquires very high velocity to impinge upon the vanes of the rotor and drive the same. To secure selective forward and astern drive, the assembly consisting of the rings 22, 24, and 26 and the annular sets of vanes 28 and 30 is mounted for axial movement so that the two sets of vanes may be selectively brought into juxtaposition with the inlet portions of the passages to effect their selective drives. For this purpose, the assembly is connected by rods 33 to pistons 34 located in cylinders 36 and arranged to be moved selectively longitudinally by liquid under pressure introduced selectively and also selectively vented through the connections 38 and 40. This may be effected in simple fashion from a supply of oil under pressure controlled by a valve arrangement which need not be described. When the pistons 34 are in the position illustrated in Figure 3, i. e., their left-hand position as therein illustrated, the reversing vanes 30 are located to effect the discharge of gas jets into the turbine passages. On the other hand, by movement of the pistons 34 to the right, the set of vanes 28 is brought into operative position to provide jets having an opposite sense of rotation. Under these circumstances, the set of vanes 30 is moved into a space indicated at 32 where they are inoperative.

During forward operation, the jets from the nozzles provided by the vanes 28 are directed to the gas passages of the wheel to effect highly efficient drive thereof. On the other hand, during reverse operation, the jets are directed to the gas passages of the wheel in a fashion which, while not highly efficient, will produce sufficient torque for relatively low speed reverse operation of the vessel.

It will be noted that throughout the reversing procedure, the flow of driving gas is not cut off and, in fact, the total flow area afforded by the nozzle passages during the reversal remains substantially constant. As a result, no sudden fluctuation in flow of gas takes place, and, consequently, the temperature can be held substantially constant throughout the reversing and throughout both forward and reverse operation.

What I claim is:

1. In combination, a turbine rotor provided with driving gas passages extending in skew relation to the axis of rotation and providing entrance portions radially outward of discharge portions thereof, and means for providing driving jets of gas to the entrance portions of said passages comprising two sets of nozzles, one set arranged to direct the jets in one direction about the axis of rotation and the other set arranged to direct the jets in the opposite direction about the axis of rotation, and means for moving said sets of nozzles selectively adjacent to the entrance portions of said passages to effect reversal of rotation of said rotor, the sets of nozzles being connected for simultaneous movement and, between their alternative positions, simultaneously directing jets of gas to the entrance portions of said passages to maintain during their movement substantially unchanged the total flow through the nozzles.

2. In combination, a turbine rotor provided with driving gas passages extending in skew relation to the axis of rotation and providing entrance portions radially outward of discharge portions thereof, and means for providing driving jets of gas to the entrance portions of said passages comprising two sets of annularly arranged nozzles, one set arranged to direct the jets in one direction about the axis of rotation and the other set arranged to direct the jets in the opposite direction about the axis of rotation, and means for moving said sets of nozzles selectively adjacent to the entrance portions of said passages to effect reversal of rotation of said rotor, the sets of nozzles being connected for simultaneous axial movement and, between their alternative positions, simultaneously directing jets of gas to the entrance portions of said passages to maintain during their movement substantially unchanged the total flow through the nozzles.

CARL R. WALLER.

REFERENCES CITED

The following references are of record in the file of this patent:

UNITED STATES PATENTS

| Number | Name | Date |
| --- | --- | --- |
| 625,328 | Fonda | May 23, 1899 |
| 2,129,918 | Fall | Sept. 13, 1938 |

FOREIGN PATENTS

| Number | Country | Date |
| --- | --- | --- |
| 38,161 | Switzerland | Dec. 1, 1906 |